A. F. DEMORY.
MILKING PAIL.
APPLICATION FILED OCT. 2, 1913.
1,107,413.
Patented Aug. 18, 1914.
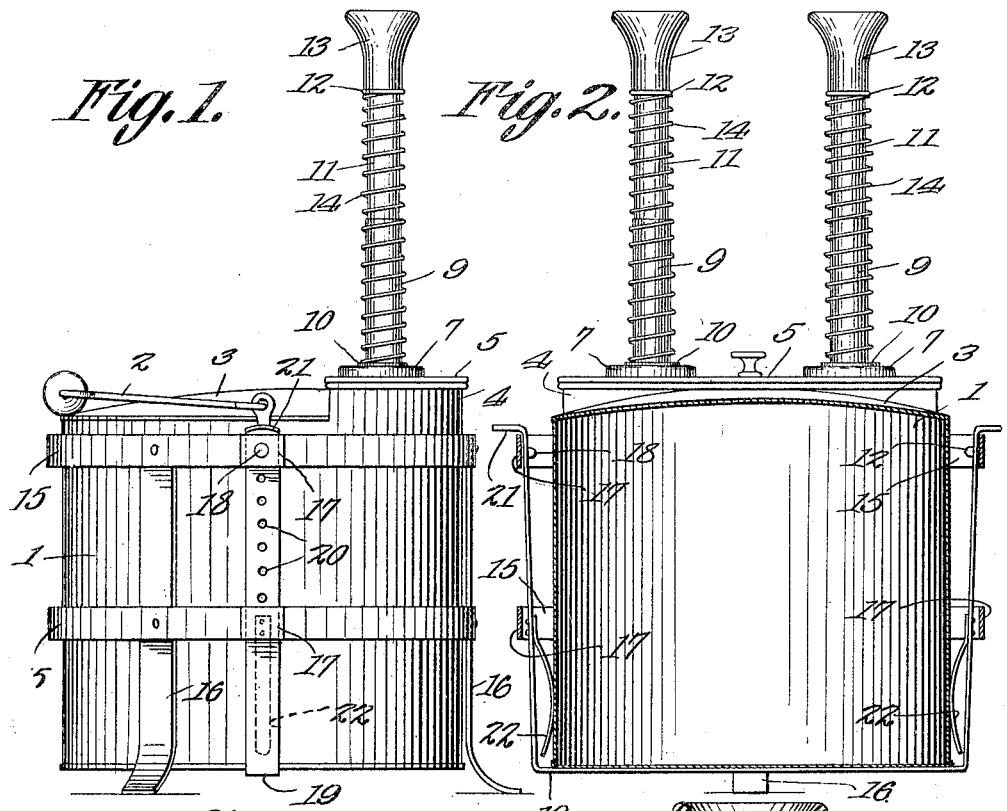
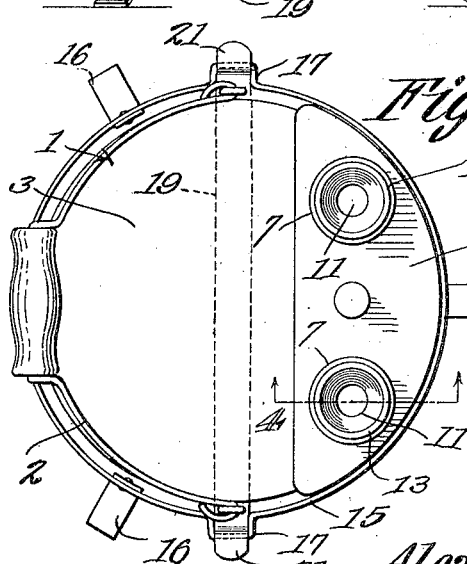
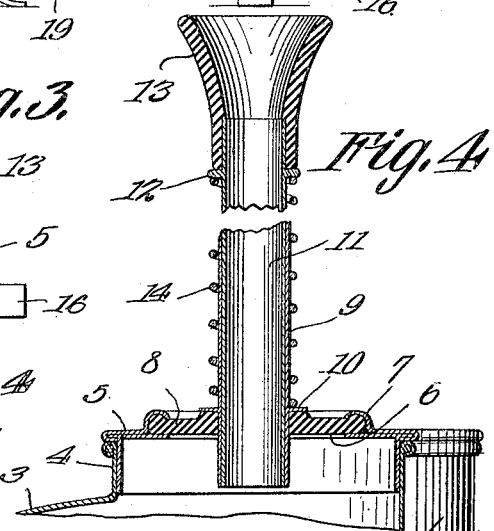
Witnesses
Alexander F. Demory, Inventor,
by C. A. Snow & Co.
Attorneys.

UNITED STATES PATENT OFFICE.

ALEXANDER F. DEMORY, OF HAGERSTOWN, MARYLAND.

MILKING-PAIL.

1,107,413.  Specification of Letters Patent.  Patented Aug. 18, 1914.

Application filed October 2, 1913. Serial No. 793,034.

*To all whom it may concern:*

Be it known that I, ALEXANDER F. DEMORY, a citizen of the United States, residing at Hagerstown, in the county of Washington and State of Maryland, have invented a new and useful Milking-Pail, of which the following is a specification.

The present invention appertains to a hand milking device, and aims to provide a novel and improved appliance of that character.

It is the object of the present invention to provide a device of the nature indicated, which will enable the operator to finger the teats or dugs in the usual manner, the present device embodying flexible milk receiving and conducting means coöperable with the teats without interfering with the movement of the fingers or hands of the operator during the milking operation.

Another object of the present invention is to provide a milk pail embodying yieldable and oscillatory milk tubes having teat cups or sockets at their upper ends, in combination with a unique means for adjustably supporting the milk pail, in order to accommodate the milk tubes to the udders of various cows.

With the foregoing general objects outlined, and with other objects in view, which will be apparent as the nature of the invention is better understood, the present invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawings, wherein:—

Figure 1 is a side elevation of the improved milking device. Fig. 2 is a central vertical section thereof. Fig. 3 is a plan view of the device. Fig. 4 is an enlarged sectional detail, taken on the line 4—4 of Fig. 3, portions being broken away.

In carrying out the present invention, there is employed a suitable type of pail or milk receptacle 1, having the bail handle 2, and the integral top 3. The top 3 is provided with a segmental shaped opening formed by a flange 4, and in which the rim or flange of a segmental shaped cover 5 is adapted to be slipped, to close the opening of the top. It is evident that the cover or closure 5 may be readily removed, to permit the milk to be discharged, when necessary. The cover 5 is provided with a pair of openings 6 adjoining its ends, annular pockets 7 being provided around the openings 6, and flexible washers or gaskets 8 being peripherally seated within the pockets 7. A sleeve 9 has one end inserted or fitted within each of the gaskets or washers 8, and is provided with an annular flange 10 adjoining its lower end, seated upon the respective gaskets, the gaskets 8 tending to maintain the sleeves 9 in erect or vertical positions, but permitting the sleeves to swing or oscillate in various directions for the purposes which will hereinafter appear. A milk tube 11 of any suitable length, is slidable through each of the sleeves 9, and is provided with an annular exterior flange 12 adjoining its upper end, a cup or socket 13 being slipped over the upper end of each of the tubes 11 and being seated upon the respective flange 12. The cups or sockets 13 are preferably constructed of rubber, leather or other suitable yielding material, and are designed to receive the ends of the teats. A coiled wire spring 14 surrounds or encompasses each of the sleeves 9 and is terminally seated against the respective flanges 10 and 12, so as to yieldingly support the respective tube 11.

In order to adjustably support the pail or receptacle 1, there is provided a frame embodying a pair of hoops or bands 15, secured over a plurality of suitable legs 16 to be supported thereby. The hoops 15 are provided at diametrically opposite points with outwardly projecting offsets 17, the upper offsets 17 being provided with inwardly projecting nibs or lugs 18. The said frame supports a pail carrier, the pail carrier being of U-shape and preferably being bent from a length of resilient material, such as a bar, or the like. The arms of the carrier 19, are disposed within the respective offsets 17 of the frame hoops, and are each provided with a longitudinal series of apertures 20, the extremities of the carrier arms being bent outwardly to provide finger holds 21. The arms of the carrier have an outward tension, tending to engage the respective openings or apertures 20 over the lugs 18, so as to support the carrier, it being evident that the carrier may be readily adjusted vertically by pressing the arms thereof inwardly out of engagement with the lugs 18, as will be apparent.

The pail 1 is adapted to be seated upon the intermediate portion of the carrier, between the arms thereof, and to frictionally hold the pail in position, a bowed or curved leaf spring 22 is secured to the inner side of each of the carrier arms, in order that the springs 22 will snugly receive the pail. The springs 22 are preferably of such tension, in order that when the pail is lifted by means of the bail 2, the frame will be carried by the pail. In other words, the tension of the springs 22 is preferably sufficient to overcome the weight of the supporting frame and carrier.

In use, the parts being assembled as above described, the frame is set upon the floor, or the like, and the pail 1 is adjusted vertically by means of the carrier 19, in order that the device may accommodate the udder, that is, in order that when the cups or sockets 13 are engaged over the ends of the teats, the milk tubes 11 will be depressed slightly against the tension of the springs 14. The operator may then pursue the usual milking operation, the cups 13 directing the milk down the tubes 11, and from thence, the milk will flow into the pail, it being observed that the milk will not be exposed to dust and other extraneous matter. The gaskets 8, although they tend to maintain the sleeves and milk tubes vertical, will permit the sleeves and tubes to swing in various directions, while the springs 14 will tend to maintain the cups 13 in engagement with the teats. The cups 13 do not interfere with the movement of the fingers in milking.

The adjustability of the pail, is of particular advantage, in connection with the yieldably supported tubes 11 passing loosely through the cover, inasmuch as the present device may be adjusted to accommodate various udders. The present device will be sanitary or hygienic in its use, and the other advantages thereof will be obvious from the foregoing, taken in connection with the drawings.

Having thus described the invention, what is claimed as new is:—

1. A hand milking device embodying a pail having a cover, the cover having an opening, a flexible gasket secured within the said opening, a sleeve fitting within the gasket, a milk tube slidable through the sleeve, and having a teat cup at its upper end, and a coiled wire spring surrounding the sleeve and the upper portion of the said tube and terminally seated thereagainst to yieldably raise the tube.

2. A hand milking device embodying a pail having a cover, the cover having an opening, a flexible gasket secured within the said opening, a sleeve fitting within the gasket and having a flange seated thereon, a milk tube slidable through the sleeve, and having a flange adjoining its upper end, a teat cup slipped over the upper end of the said tube and seated on the last mentioned flange, and a coiled spring surrounding the sleeve and the upper portion of the said tube and terminally seated against the said flanges.

3. In a milking device, a frame, a vertically adjustable pail carrier supported thereby, a pail removably supported upon the said carrier, a cover for the pail, and a spring raised milk tube passing loosely through the cover and having a teat cup at its upper end.

4. In a milking device, a frame, a U-shaped pail carrier disposed therein and having resilient arms, the frame having portions to receive the said arms, certain of said portions having lugs and the carrier arms having apertures engageable over the said lugs, a pail seated upon the carrier within the frame, the arms of the carrier having yieldable pail engaging means, a cover for the pail, and a spring raised milk tube passing loosely through the cover and having a teat cup at its upper end.

5. In a milking device, a frame embodying hoops and legs attached thereto, the hoops having diametrically opposite outwardly projecting offsets, the upper offsets having inwardly projecting lugs, a U-shaped carrier having its arms fitting within the said offsets, the arms of the carrier having an outward tension and having apertures engageable over the said lugs, a pail seated upon the intermediate portion of the carrier, bowed leaf springs secured to the inner sides of the carrier arms and frictionally engaging the pail, a cover for the pail, and spring raised milk tubes passing loosely through the cover and having teat cups at their upper ends.

In testimony that I claim the foregoing as my own, I have hereto affixed my signature in the presence of two witnesses.

ALEXANDER F. DEMORY.

Witnesses:
SELINA WILLSON,
I. E. SIMPSON.

Copies of this patent may be obtained for five cents each, by addressing the "Commissioner of Patents, Washington, D. C."